T. E. MURRAY, Jr.
METER TESTING DEVICE.
APPLICATION FILED DEC. 2, 1915.

1,189,855.

Patented July 4, 1916.
3 SHEETS—SHEET 1.

Inventor
Thomas E. Murray Jr.
By his Attorney

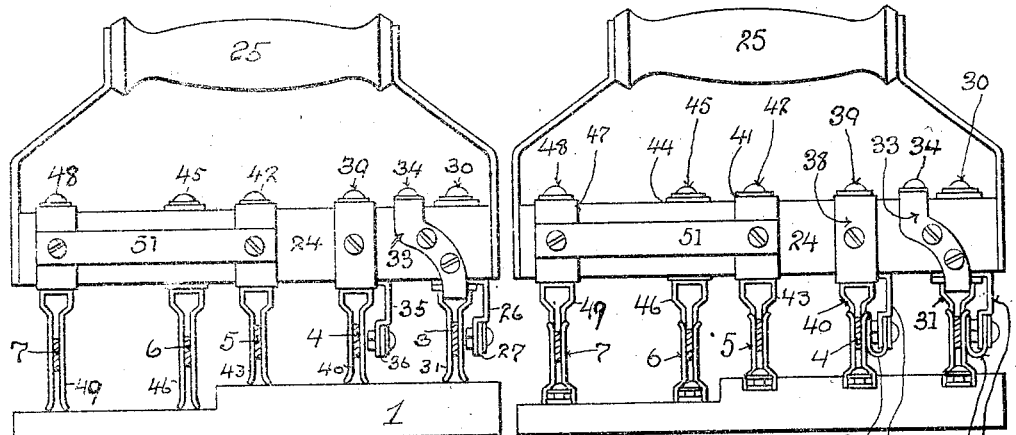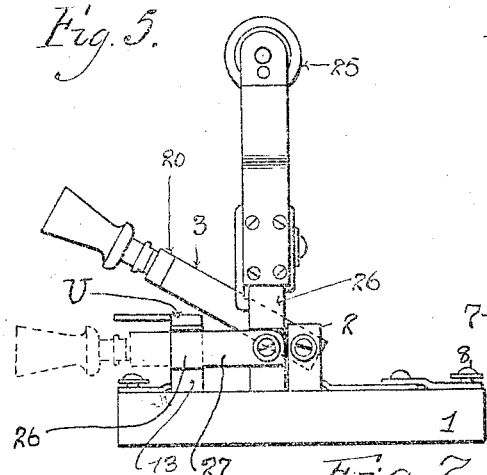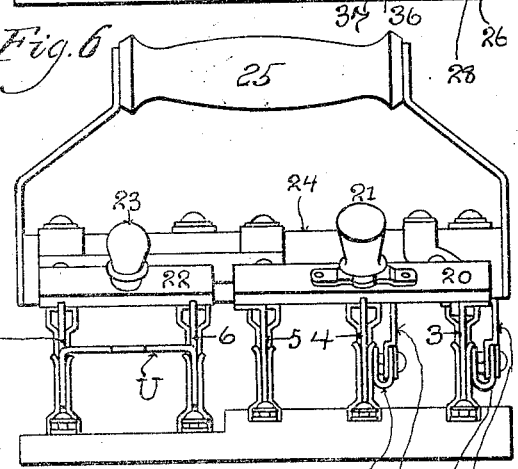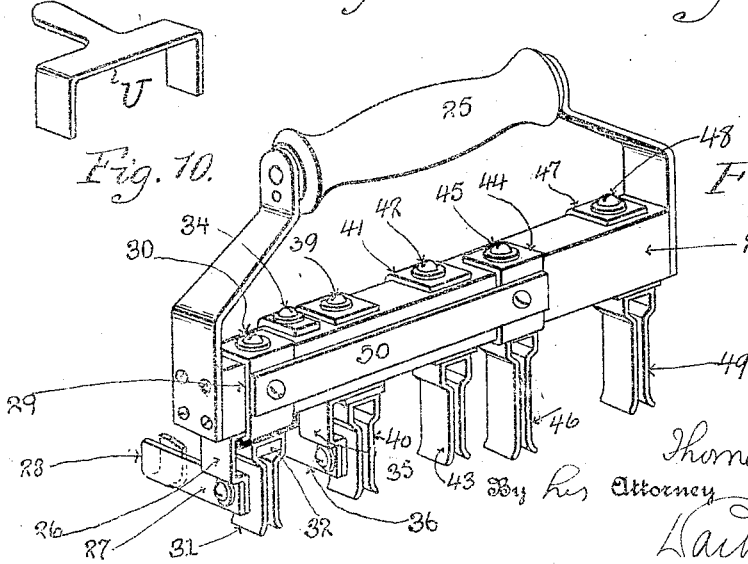

UNITED STATES PATENT OFFICE.

THOMAS E. MURRAY, JR., OF BROOKLYN, NEW YORK, ASSIGNOR TO THOMAS E. MURRAY, OF NEW YORK, N. Y.

METER-TESTING DEVICE.

1,189,855.      Specification of Letters Patent.      Patented July 4, 1916.

Application filed December 2, 1915. Serial No. 84,693.

*To all whom it may concern:*

Be it known that I, THOMAS E. MURRAY, Jr., a citizen of the United States, residing at Brooklyn, in the county of Kings and State of New York, have invented a certain new and useful Improvement in Meter-Testing Devices, of which the following is a specification.

The invention relates to meter testing cut-outs, and consists in the construction more particularly hereinafter set forth.

A single gang plug coöperates with the pivoted levers of the service switch to shunt the line around the meter, thus providing for the continuance of the customer's service during the test. When the switch levers are swung upward in position to open circuit to the meter, pivoted contact arms on said gang plug continue to keep the circuit closed to the meter through a potential conductor and the neutral conductor of the three-wire line system. The insertion of a bridge between two of the meter terminals connects the current coils of the meter in circuit. The testing conditions are thus established, and the meter reading is compared with that of a standard wattmeter suitably connected to said gang plug.

Figure 1:
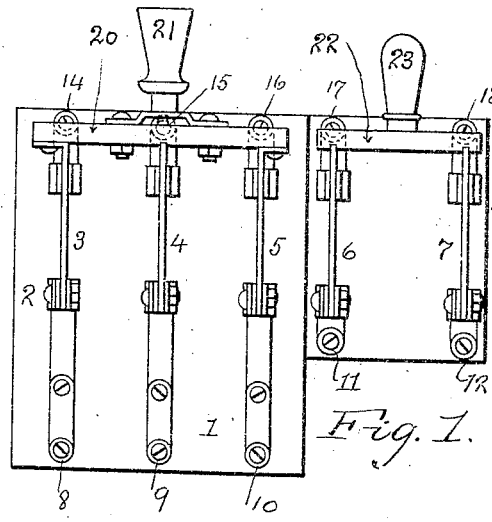
Figure 3:
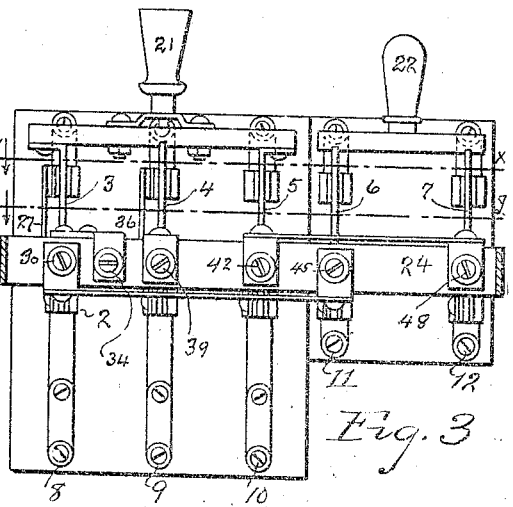
Figure 2:
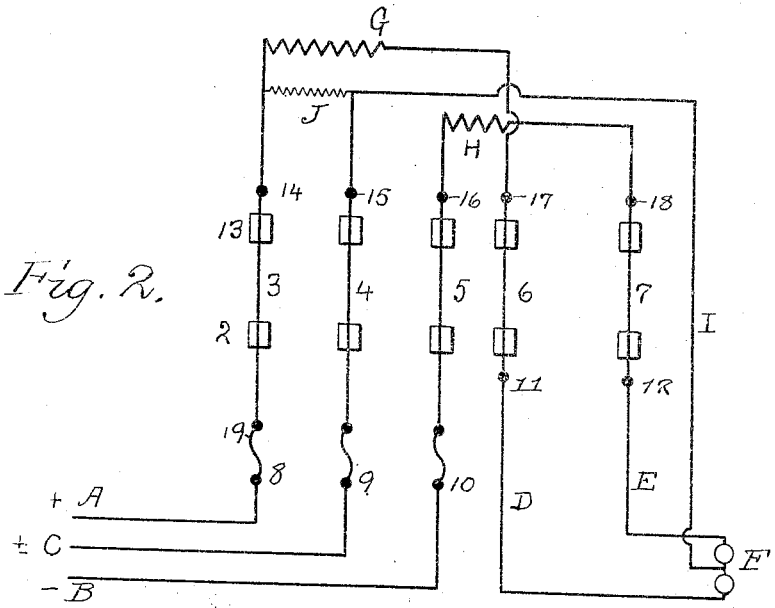
Figure 4:
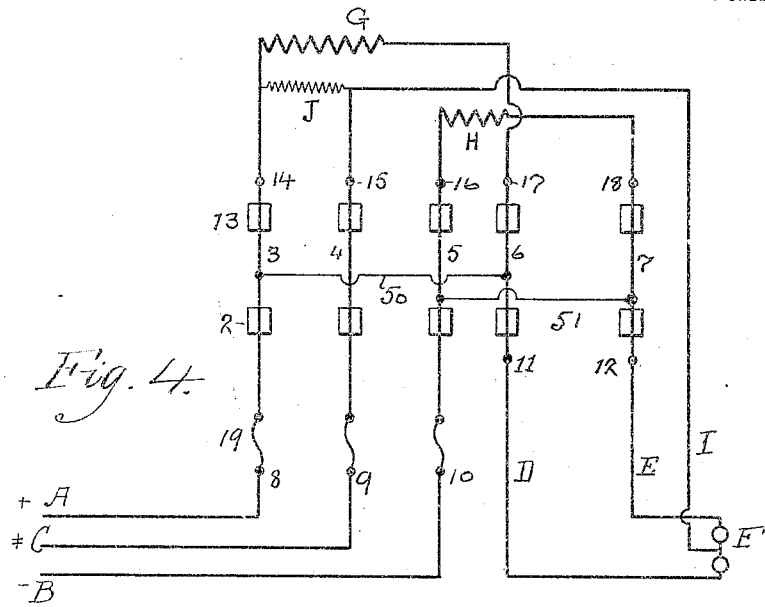
Figure 9:
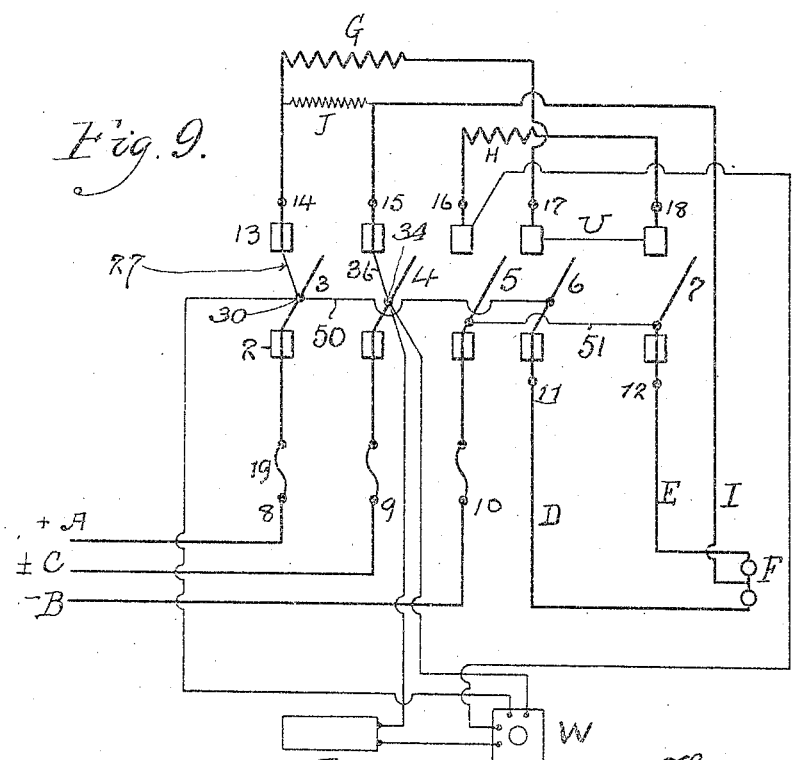

In the accompanying drawings Figure 1 is a plan view of a service switch for a three-wire system, to which I apply devices, as hereinafter described, for shunting the load around the meter and connecting said meter in circuit with testing apparatus. Fig. 2 is an electrical diagram showing the connections as in Fig. 1. Fig. 3 is a plan view of the service switch with the gang plug in place. Fig. 4 is a diagram showing the connections corresponding to Fig. 3. Fig. 5 is a section on the line $x$, $x$ and Fig. 6 is a section on the line $y$, $y$ of Fig. 3, viewed in the direction of the arrows in said figure. Fig. 7 is a side elevation showing the switch lever 3 in raised position and the pivoted contact arm 27 remaining in contact with one of the clips 13. Fig. 8 is an end elevation showing the switch levers in position for making the meter test. Fig. 9 is a diagram showing the connections corresponding to Fig. 8. Fig. 10 is a perspective view of the bridge U. Fig. 11 is a perspective view of the gang plug.

Similar numbers and letters of reference indicate like parts.

The service switch shown in Fig. 1 comprises a base 1, on which is a series of supports 2 wherein are pivoted the switch levers 3, 4, 5, 6, 7. Said supports are electrically connected to the terminals 8, 9, 10, 11, 12. The service lead A, here positive, is connected to the terminal 8. The service lead B, here negative, is connected to terminal 10. The service lead C, here neutral, is connected to terminal 9. The positive lead D and negative lead E from the load F are respectively connected to terminals 11 and 12. The switch levers 3, 4, 5, 6 and 7 coöperate respectively with contact clips 13, which in turn are connected to terminals 14, 15, 16, 17, 18. The meter shown diagrammatically in Figs. 2, 4 and 9 has one of its current coils G connected to terminals 14, 17 and the other of its current coils H connected to terminals 16, 18. The neutral lead I from the load F is connected to terminal 15 and the potential coil J is connected across the line from positive to neutral lead in the usual way. Fuses 19 are preferably placed between the terminals 8, 9, 10 and the pivot supports of levers 3, 4, 5. The levers 3, 4, 5 are united by a bar 20 of insulating material, having an operating handle 21. The levers 6, 7 are similarly united by a bar 22 having handle 23. It will be obvious from Fig. 2 that the supply current passes through the meter to the load—this being the normal service condition.

The testing gang plug, shown in perspective in Fig. 11, in plan in Fig. 3, in side elevation in Figs. 5 and 6 and in end elevation in Fig. 7, comprises the contacts and connections hereinafter set forth mounted on a bar 24 of insulating material, provided with a handle 25. Beginning on the left of Fig. 11, a depending bracket arm 26 carries at its lower end a pivoted arm 27, at the extremity of which is a U-shaped spring contact 28. The upper portion of arm 26 is bent at right angles to enter between bar 24 and a metal strap 29 which extends over the top of bar 24 and receives a binding screw 30. On the under side of the lower portion of arm 26 is a plate of insulating material, and below this is a depending contact clip 31. Contact clip 31 is supported by an arm 32 of a metal strip 33, Fig. 6, which extends over the top of bar 24 and receives a binding screw 34. To a bracket arm 35, similar to bracket arm 26, is pivoted an arm 36, similar to arm 27, carrying at its end a U-shaped spring contact 37, similar to contact 28. The upper portion of bracket arm 35 is bent at right angles to enter between bar 24 and a metal strap 38 which extends over the top of bar 24 and receives a binding screw 39. The bracket arm 35 is soldered to the upper surface of the bent over lower end of strap 38, and the spring contact clip 40 is soldered to the lower surface of said end. A strap 41 bent over the top and bottom of bar 24 receives above said bar a binding post 42, and has soldered to it below said bar a spring contact clip 43. A strap 44 bent over the top and bottom of bar 24 receives above said bar a binding post 45, and has soldered to it below said bar a spring contact clip 46. A strap 47 bent over the top and bottom of bar 24 receives above said bar a binding post 48, and has soldered to it below said bar a spring contact clip 49. On one side of bar 24 (Fig. 11) the straps 29 and 44 are connected by a strap 50. On the other side of bar 24 (Fig. 6) the straps 41 and 47 are connected by a strap 51.

When the gang plug is applied for the purposes of the test, the clips 31, 40, 43, 46, 49 respectively receive the switch levers 3, 4, 5, 6, 7, as shown in Fig. 5. Consequently, as shown in the diagram Fig. 4, the line is shunted around the meter, because circuit is completed by the straps 50, 51 directly from the service to the load leads. The testing apparatus—here a wattmeter W and a load box T—are connected to the gang plug, as follows: The potential leads of the wattmeter are connected to binding posts 30, 34, Fig. 9. One current lead is connected through the load box T to binding post 34. The other current lead is electrically connected to meter terminal 16. In order to make the test, the switch levers 3, 4, 5, 6, 7 are raised out of their clips 13. That opens circuit everywhere except through the positive and neutral leads A, C, because these are kept closed by the pivoted arms 27, 36, which despite the lifting of levers 3, 4, still remain in contact with their clips 13. It is to be noted that resiliency of the U-shaped form of the contacts 28, 37 on the ends of said arms insures their being pressed closely against the sides of said clips. All that remains to be done is to connect the current coils together, and this is accomplished by inserting the bridge U, shown in Fig. 10, between the two contacts 13 which communicate with terminals 17 and 18. The series circuit to the wattmeter then is from positive supply lead A to arm 27, terminal 14, meter current coil G, terminal 17, bridge U, terminal 18, meter current coil H, terminal 16, to wattmeter W, and thence by lead box T, to neutral lead C. The potential circuit is from the wattmeter W to arm 27, terminal 14, potential coil J, terminal 15, arm 36, and so again to wattmeter W.

I claim:

1. A meter testing cut-out, comprising a base, line and meter terminals of a three-wire system thereon, service switch levers interposed between said line terminals and said meter terminals, a gang plug coöperating with said levers, fixed connections on said plug for shunting the line around said meter, two pivoted arms on said plug constructed to maintain closed circuit to the meter through a potential conductor and the neutral conductor of said system when said levers are moved into position to open circuit to the meter, a separate bridge constructed to be interposed between two of said meter terminals to electrically connect the current coils of said meter, and testing apparatus connected to said gang plug.

2. A meter testing cut-out, comprising a base, line and meter terminals of a three-wire system thereon, service switch levers interposed between said line terminals and said meter terminals, a gang plug, a plurality of contacts depending therefrom and engaging said levers, fixed connections on said plug between certain of said contacts for shunting the line around said meter, two depending brackets on said plug, arms pivoted to said brackets and constructed to maintain closed circuit to the meter through a potential conductor and the neutral conductor of said system when said levers are moved into position to open circuit to the meter, a separate bridge constructed to be interposed between two of said meter terminals to electrically connect the current coils of said meter, and testing apparatus connected to said gang plug.

In testimony whereof I have affixed my signature in presence of two witnesses.

THOMAS E. MURRAY, Jr.

Witnesses:
GERTRUDE T. PORTER,
MAY T. McGARRY.